United States Patent
Ayyappan et al.

(10) Patent No.: US 10,099,611 B2
(45) Date of Patent: Oct. 16, 2018

(54) METHOD FOR WARNING A DRIVER OF A VEHICLE OF THE PRESENCE OF AN OBJECT IN THE SURROUNDINGS, DRIVER ASSISTANCE SYSTEM AND MOTOR VEHICLE

(71) Applicant: VALEO Schalter und Sensoren GmbH, Bietigheim-Bissingen (DE)

(72) Inventors: Thirumalai Kumarasamy Ayyappan, Bietigheim-Bissingen (DE); Markus Heimberger, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/505,358

(22) PCT Filed: Aug. 20, 2015

(86) PCT No.: PCT/EP2015/069122
§ 371 (c)(1),
(2) Date: Jul. 11, 2017

(87) PCT Pub. No.: WO2016/026922
PCT Pub. Date: Feb. 25, 2016

(65) Prior Publication Data
US 2017/0305341 A1   Oct. 26, 2017

(30) Foreign Application Priority Data
Aug. 21, 2014   (DE) .................. 10 2014 111 951

(51) Int. Cl.
*B60Q 9/00*  (2006.01)
*G01S 13/93*  (2006.01)

(52) U.S. Cl.
CPC ............ *B60Q 9/008* (2013.01); *G01S 13/931* (2013.01); *G01S 2013/9364* (2013.01); *G01S 2013/9367* (2013.01)

(58) Field of Classification Search
CPC ........ B60Q 9/006; B60Q 9/007; B60Q 9/008; G01S 13/931
(Continued)

(56) References Cited

U.S. PATENT DOCUMENTS 5,748,477 A * 5/1998 Katoh ................... B60T 7/22
                                                       280/735
6,087,928 A * 7/2000 Kleinberg ............. B60Q 9/008
                                                       340/435

(Continued)

FOREIGN PATENT DOCUMENTS

DE    198 43 564 A1    3/2000
DE    101 28 792 A1    11/2002
(Continued)

OTHER PUBLICATIONS

International Search Report issued PCT/EP2015/069122, dated Jan. 7, 2016 (3 pages).
(Continued)

*Primary Examiner* — Hung T Nguyen
(74) *Attorney, Agent, or Firm* — Osha Liang LLP

(57) ABSTRACT

The invention relates to a method for warning a driver of a motor vehicle (1) about the presence of an object (12) in the surroundings (7) of the motor vehicle (1) by means of a driver assistance system (2), in which a position of the object (12) is determined by means of a sensor device (9), an anticipated driving tube (14) of the motor vehicle (1) is determined, a collision distance (DTC), which describes a distance between the motor vehicle (1) and the object (12) when the motor vehicle (1) moves within the determined
(Continued)

driving tube (14), is determined on the basis of the determined position of the object (12) and the determined driving tube (14), a minimum distance (SD) between the motor vehicle (1) and the object (12) is determined, and a warning signal is output if the value of the minimum distance (SD) undershoots a predetermined limiting value, wherein the determined value of the minimum distance is adapted as a function of the determined collision distance (DTC).

11 Claims, 6 Drawing Sheets

(58) Field of Classification Search
USPC ............... 340/435, 436, 438; 701/300, 301; 342/70, 455
See application file for complete search history.

(56) References Cited

U.S. PATENT DOCUMENTS

| | | | | |
|---|---|---|---|---|
| 8,330,592 | B2* | 12/2012 | von Zeppelin | ....... B60W 30/16 340/435 |
| 9,047,780 | B2* | 6/2015 | Guarnizo Martinez | ..................... B60W 30/09 |
| 2007/0255498 | A1* | 11/2007 | McDaniel | ............. G01S 13/931 701/301 |
| 2010/0332078 | A1* | 12/2010 | Hering | .................... G01S 15/87 701/36 |

FOREIGN PATENT DOCUMENTS

| | | |
|---|---|---|
| DE | 10 2010 023164 A1 | 12/2011 |
| DE | 10 2010 061829 A1 | 5/2012 |
| DE | 10 2011 121728 A1 | 6/2013 |
| DE | 10 2012 203 228 A1 | 9/2013 |
| EP | 2 338 733 A1 | 6/2011 |
| JP | 2014-078107 A | 5/2014 |
| WO | 2013/037539 A1 | 3/2013 |

OTHER PUBLICATIONS

Written Opinion of the International Searching Authority issued in PCT/EP2015/069122, dated Jan. 7, 2016 (7 pages).

The Notification of Reasons for Refusal issued in corresponding Japanese Patent Application No. 2017-510387 dated Mar. 9, 2018 (11 pages).

* cited by examiner

METHOD FOR WARNING A DRIVER OF A VEHICLE OF THE PRESENCE OF AN OBJECT IN THE SURROUNDINGS, DRIVER ASSISTANCE SYSTEM AND MOTOR VEHICLE

The present invention relates to a method for warning a driver of a motor vehicle about the presence of an object in the surroundings of the motor vehicle by means of a driver assistance system, in which a position of the motor vehicle is determined by means of a sensor device, an anticipated driving tube of the motor vehicle is determined, a collision distance, which describes a distance between the motor vehicle and the object when the motor vehicle moves within the determined driving tube, is determined on the basis of the determined position of the object and the determined driving tube, a value of a minimum distance between the motor vehicle and the object is determined, and a warning signal is output if the value of the minimum distance undershoots a predetermined limiting value. The invention also relates to a driver assistance system and to a motor vehicle having such a driver assistance system.

BACKGROUND

We are concerned here, in particular, with so-called collision warning systems which warn a driver of a motor vehicle when a collision between a motor vehicle and the vehicle-external object is imminent. In order to warn the driver it is possible, for example, for an acoustic or a visual warning signal to be output. In this context, DE 10 2012 203 228 A1 describes a method for avoiding or for attenuating consequences in the case of collisions of a motor vehicle with an obstacle in a nearby region to the side of the motor vehicle. In the method, a driving tube of the motor vehicle is determined and a collision is determined on the basis of the driving tube of the motor vehicle and the position of the obstacle. In addition, when the risk of a collision is determined, a steering angle of rear wheels of the motor vehicle is set in such a way that the obstacle is avoided.

Furthermore, DE 101 28 792 A1 describes a system for avoiding collisions of a vehicle with obstacles. In this context, during the continuation of the journey in the next time periods the required driving space of the motor vehicle is calculated in advance and compared with the detected actual obstacle-free driving space which is present. This comparison provides an early prediction of a possible collision. The driver is alerted to the risk of collision by corresponding warning devices and can therefore react promptly. For example, a warning signal can be output if a predefined distance is undershot.

Furthermore, a warning device for motor vehicles is known from DE 198 43 564 A1. The warning device serves to monitor a distance of a vehicle from an obstacle and has a warning signal generator which is controlled by an evaluation and control device for generating a close-range warning signal if the distance estimated by the evaluation and control device is lower than a limiting value. Furthermore, there is provision that the evaluation and control device comprises means for estimating a collision of the vehicle with the obstacle on the basis of the estimated distance and the speed of the vehicle, and that the evaluation and control device controls the warning signal generator to output a long-range warning signal if the estimated distance is higher than the limiting value and the estimation reveals the presence of a risk of collision.

In addition, DE 10 2010 023 164 A1 describes a method for warning a driver of a motor vehicle about the presence of an object in the surroundings. In this context, a relative position of the object with respect to the motor vehicle and an anticipated driving path of the motor vehicle are determined. The driver is warned by a driver assistance system after a warning criterion is met, wherein in this context the actual length of the driving path between the motor vehicle and the object is taken into account. In this case, the driver is therefore warned only if it is actually necessary.

SUMMARY

The object of the present invention is to indicate a solution as to how a driver of a motor vehicle can be particularly reliably warned about an object in the surroundings in accordance with requirements.

This object is achieved according to the invention by means of a method, by means of a driver assistance system and by means of a motor vehicle having the features according to the respective independent patent claims. Advantageous refinements of the invention are the subject matter of the dependent patent claims, of the description and of the figures.

A method according to the invention serves for warning a driver of a motor vehicle about the presence of an object in the surroundings of the motor vehicle by means of a driver assistance system of the motor vehicle. In the method, a position of the object is determined by means of a sensor device, and an anticipated driving tube of the motor vehicle is determined. In addition, a collision distance, which describes a distance between the motor vehicle and the object when the object moves within the determined driving tube, is determined on the basis of the determined position of the object and the determined driving tube. Furthermore, a value of a minimum distance between the motor vehicle and the object is determined. In addition, a warning signal is output if the value of the minimum distance undershoots a predetermined limiting value, wherein the determined value of the minimum distance is adapted as a function of the determined collision distance.

The present invention is based on the realization that the driver of a motor vehicle can be warned about an object in the surroundings in a way which is particularly appropriate for the requirements if the warning signal is output as a function of the collision distance, that is to say a predicted distance from the collision. The warning signal is output here if a value of the minimum distance between the motor vehicle and the object undershoots a predetermined limiting value. The minimum distance, which is also referred to as the shortest distance (SD), constitutes the shortest distance between the motor vehicle, for example the bodywork of the motor vehicle, and the object. A value or a measured value is determined for the minimum distance. The value therefore characterizes the minimum distance. The warning of the driver as a function of the value of the minimum distance has the advantage that the driver can understand the minimum distance and link it to the real world.

In addition, a driving tube of the motor vehicle is determined here, and a collision distance is determined on the basis of the driving tube and the position of the object relative to the motor vehicle. The collision distance, which can also be referred to as the distance to collision (DTC), describes the distance between the motor vehicle and the object when the motor vehicle moves within the driving tube. In other words, the collision distance describes the distance between the object and the region of the motor vehicle which will collide with the object. Therefore, the area of the motor vehicle which would collide with the object when the motor vehicle moves within the driving tube is taken into account in the collision distance. It is also possible to determine a value or measured value of the collision distance. The collision distance and the minimum distance can differ as a function of the relative position of the motor vehicle with respect to the object and of the driving tube. A predicted warning can therefore also be made available by the adaptation of the value of the minimum distance as a function of the determined collision distance. Therefore, in order to determine the warning signal it is not the actual minimum distance but rather an adapted value of the minimum distance which is used here. It is therefore possible to make the calculation based on an adapted value of the minimum distance which differs from the actual minimum distance. It can therefore be provided, for example, that the warning signal is output earlier and the driver therefore has more time to react.

In one embodiment, the collision distance is determined as a function of time, and the determined value of the minimum distance is adapted if the collision distance changes as a function of time. The collision distance can be determined, for example, at predetermined times. In this context it is possible to examine whether the respective collision distance which was determined at the predetermined times differs. It is also conceivable here for the collision distance to be continuously determined during the movement of the motor vehicle. In this way, the value of the minimum distance can be adapted continuously with respect to the relative position of the motor vehicle in relation to the object.

The determined value of the minimum distance is preferably reduced if the determined collision distance reduces as a function of time. It is therefore possible, as it were, to determine a relative speed between the motor vehicle and the object and to take it into account in the change or reduction of the value of the minimum distance. It is therefore possible, for example, to prevent a warning signal from already being output in the driving state in which there is not yet any risk of a collision with the object. In this way it is possible to prevent the driver being disturbed or upset by warning signals. In addition, it is possible to prevent a warning signal from being output in the case of a slight movement of the steering wheel.

Furthermore, it has proven advantageous if a correction value is determined on the basis of the reduction in the collision distance as a function of time, and the value of the minimum distance is reduced by the correction value. For the reduction in the collision distance as a function of time it is possible to store predetermined correction values in a memory unit of the driver assistance system. These correction values can be subtracted from the value of the minimum distance as a function of the determined reduction in the collision distance. The value of the minimum distance can therefore be adapted particularly easily.

The collision distance is preferably determined continuously during a predetermined time period. The collision distance can therefore be detected continuously. It is also conceivable in this context for the value of the minimum distance to be adapted continuously as a function of the detected change in the collision distance. In this way, the driver can be warned particularly reliably.

The predetermined time period in which the collision distance is continuously determined preferably lies in an interval between 100 ms and 150 ms. In this time interval, the collision distance between the motor vehicle and the object can be reliably detected during the movement of the motor vehicle relative to the object. Subsequent to this it is possible to check whether the collision distance has changed as a function of time, and whether the value of the minimum distance has to be adapted. In this way, the value of the minimum distance can be reliably adapted even during the movement of the motor vehicle.

Furthermore, it has proven advantageous if a visual signal is output as the warning signal if the limiting value is undershot. Such a visual signal can be displayed to the driver, for example, on a display device of the motor vehicle. It is also conceivable in this context that the current or the adapted value of the minimum distance is displayed visually. Alternatively or additionally, the limiting value starting at which a warning is issued can be displayed. The driver can therefore be reliably warned about a collision with the object.

In a further embodiment, an acoustic signal is output as the warning signal if the limiting value is undershot, and a change in the collision distance is determined as a function of time. Additionally or alternatively to the visual warning signal, an acoustic signal can be output. This can be done, for example, with a corresponding acoustic output device, for example with a loudspeaker, of the motor vehicle. In this context, the acoustic signal is output only if the collision distance changes as a function of time. If the collision distance remains essentially constant, an acoustic warning can be omitted. It is advantageous, for example, if the motor vehicle moves parallel to an obstacle.

A steering angle and/or a speed of the motor vehicle are preferably determined and the anticipated driving tube is determined on the basis of the determined steering angle and/or the determined speed. The steering angle of the motor vehicle can be determined, for example, on the basis of the data of a steering angle sensor. In order to determine the speed of the motor vehicle it is possible to detect, for example, the wheel rotational speed of at least one wheel of the motor vehicle. Moreover, it is possible to take into account the dimensions of the motor vehicle which are stored, for example, in a memory device of the driver assistance system. Furthermore, models which describe the movement of the motor vehicle can be taken into account. In this way, the anticipated driving tube can be reliably determined.

A driver assistance system according to the invention is designed to carry out a method according to the invention. The driver assistance system preferably comprises a sensor device for determining a position of an object, wherein the sensor device has at least one ultrasonic sensor, at least one camera, at least one radar sensor and/or at least one laser sensor. The relative position with respect to the object can therefore be reliably determined with the sensor device or with corresponding distance sensors.

A motor vehicle according to the invention comprises a driver assistance system according to the invention. The motor vehicle is embodied, in particular, as a passenger car.

Embodiments presented with respect to the method according to the invention, and the advantages thereof, apply correspondingly to the driver assistance system according to the invention as well as to the motor vehicle according to the invention.

Further features of the invention can be found in the claims, the figures and the description of the figures. All the features and combinations of features mentioned above in the description as well as the features and combinations of features mentioned below in the description of the figures and/or shown solely in the figures can be used not only in the respectively specified combination but also in other combinations or else alone.

BRIEF DESCRIPTION OF THE DRAWINGS

The invention will now be explained in more detail on the basis of a preferred exemplary embodiment and with reference to appended drawings In the drawings.

DETAILED DESCRIPTION

Figure 1:
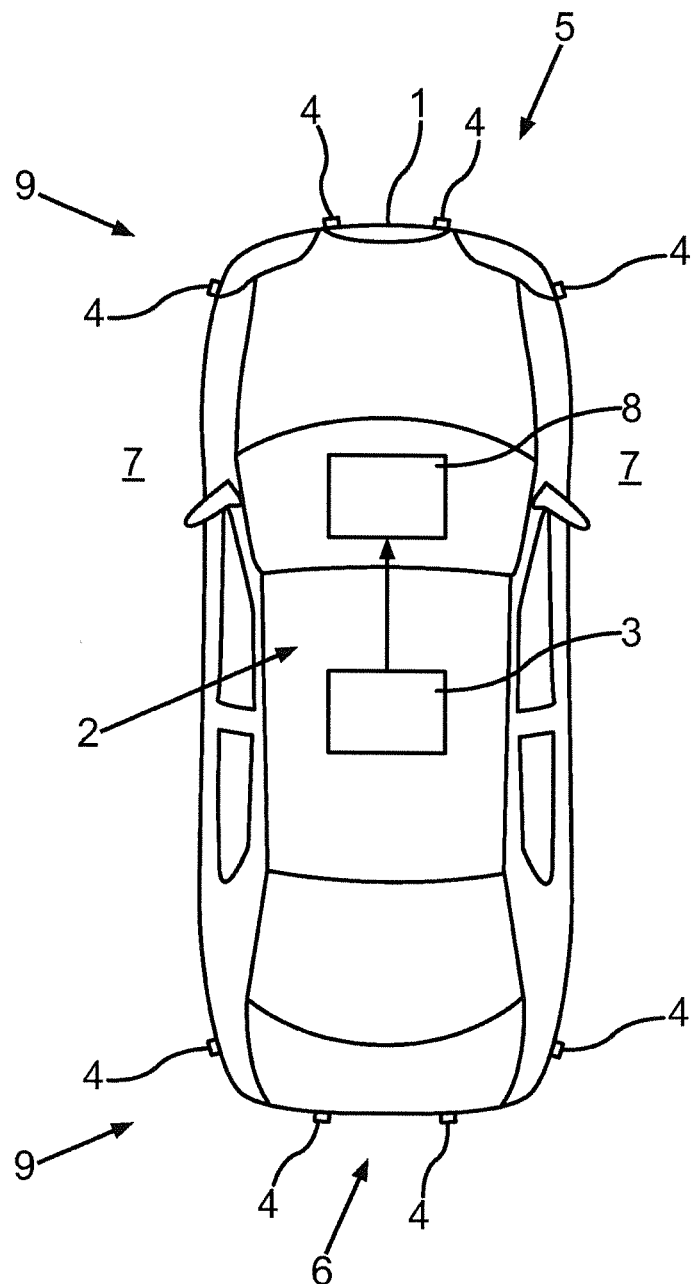
FIG. 1 shows a schematic illustration of a motor vehicle according to an embodiment of the invention.

FIG. 1 shows a motor vehicle according to an embodiment of the present invention. The motor vehicle 1 is embodied as a passenger car in the present exemplary embodiment. The motor vehicle 1 comprises a driver assistance system 2. The driver assistance system 2 in turn comprises a control device 3, which can be formed, for example, by a control unit of the motor vehicle 1. Furthermore, the driver assistance system 2 comprises a sensor device 9.

In the present exemplary embodiment, the sensor device 9 comprises eight distance sensors 4. In this context, four distance sensors 4 are arranged in a front region 5 of the motor vehicle 1, and four distance sensors 4 are arranged in a rear region 6 of the motor vehicle 1. The distance sensors 4 are designed, in particular, to detect an object 12 in the surroundings 7 of the motor vehicle 1. Moreover, the distance sensors 4 can, in particular, be configured to determine a distance from the object 12 in the surroundings 7 of the motor vehicle 1. The distance sensors 4 may be embodied, for example, as ultrasonic sensors, radar sensors, laser scanners, cameras or the like. Furthermore, there may also be provision for further distance sensors to be arranged, for example, on an outer side region of the motor vehicle 1.

The motor vehicle 1 also comprises an output device 8 which is arranged in a passenger compartment of the motor vehicle 1. The output device 8 can comprise, for example, a screen or a display with which a visual output can be made. Alternatively or additionally, the output device 8 can be designed to output an acoustic signal. For this purpose, the output device 8 can comprise, for example, a corresponding loudspeaker.

The control device 3 is connected to the distance sensors 4 for the transmission of data. Corresponding data lines are not illustrated here for the sake of clarity. The control device 3 is also connected to the output device 8 for the transmission of data. It is therefore possible to control, for example, a visual display on the output device 8 by means of the control device 3. Alternatively or additionally, the outputting of an acoustic signal can be controlled with the control device 3.

With the distance sensors 4, the object 12 can be detected in the surroundings 7 of the motor vehicle 1. In addition, the distance from the object 12 can be determined. For this purpose, for example, a signal can be emitted with at least one of the distance sensors 4, and the signal which is reflected by the object 12 can be received again. On the basis of the transit time of the signal, the distance from the object 12 can be determined by means of the control device 3. The control device 3 is also designed to calculate an anticipated driving tube 14 of the motor vehicle 1. For this purpose, the signals of a steering angle sensor and/or of a speed sensor of the motor vehicle 1 can be taken into account. On the basis of the current speed and/or the current steering angle, the anticipated driving tube 14 can be calculated. The external dimensions of the motor vehicle 1 can also be taken into account for this purpose and are stored, for example, in a memory unit of the control device 3.

If an object 12 is detected in the surroundings 7 of the motor vehicle 1, and the distance from the object 12 is determined, a value or a measured value can be determined for a minimum distance SD from the object 12. The minimum distance SD, which can also be referred to as shortest distance, represents the shortest distance from an external surface of the motor vehicle 1 to the object 12. Furthermore, a collision distance DTC, which can also be referred to as distance to collision, can be calculated. A value or measured value of the collision distance DTC can also be determined. The collision distance DTC describes the distance of the motor vehicle 1 from the object 12 during the movement of the motor vehicle 1 within the driving tube 14. In this way it is possible to determine, for example, which part of the motor vehicle 1 will collide, under certain circumstances, with the object 12 during the travel within the driving tube 14. As is explained in more detail below, the minimum distance SD and the collision distance DTC can differ.

Figure 2:
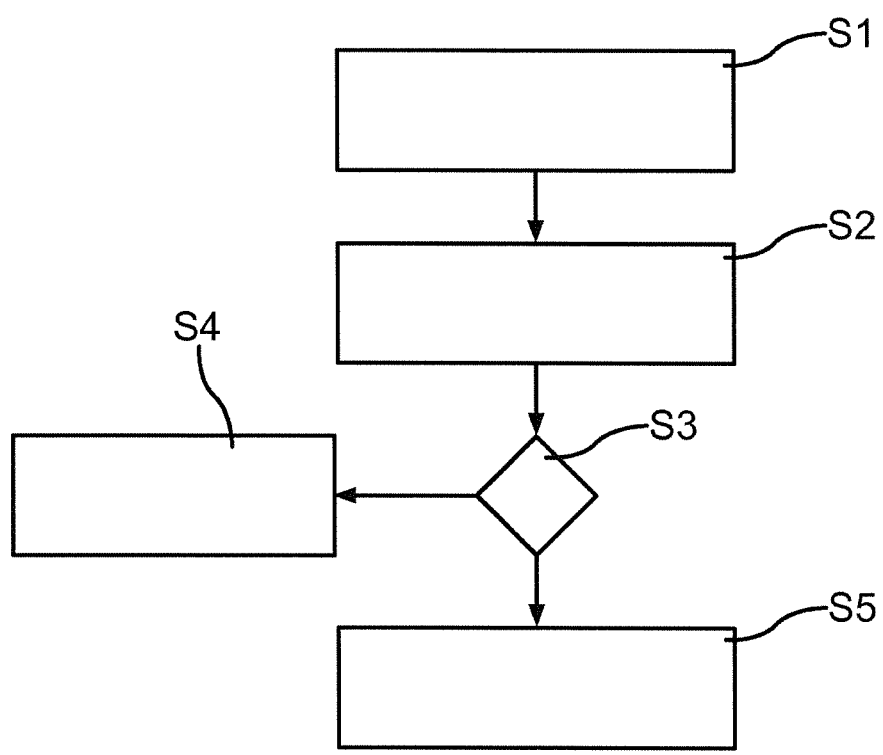
FIG. 2 shows a flowchart of a method according to an embodiment of the invention.

FIG. 2 shows a flowchart according to an embodiment of a method according to the invention for warning a driver of the motor vehicle 1 about the presence of an object 12 in the surroundings 7 of the motor vehicle 1. In a first step S1, the method is started. The method can be started, for example, during the starting of the motor vehicle 1 or during the activation of an ignition of the motor vehicle 1. With the distance sensors 4 it is checked whether an object 12 is located in the surroundings 7 of the motor vehicle 1. In addition, a limiting value of the minimum distance SD between the motor vehicle 1 and the object 12 is defined. If the value of the minimum distance SD undershoots the predetermined limiting value, a warning signal is output to the driver of the motor vehicle 1. This warning signal can be issued acoustically and/or visually via the output device 8. The predetermined limiting value of the minimum distance SD can be established in the step S1. The limiting value SD can, however, also be stored in a memory unit of the control device 3. The limiting value SD can lie, for example, in a range between 200 mm and 250 mm.

In a further step S2, the collision distance DTC between the motor vehicle 1 and the object 12 is determined. The collision distance DTC describes, in particular, the distance between the object 12 and the region of the motor vehicle 1 with which a collision will take place during the travel of the motor vehicle 1 in the driving tube 14. The collision distance DTC is detected, in particular, continuously or at predetermined times. Furthermore, it is advantageous if the collision distance DTC is determined in a predetermined time interval, continuously or at predetermined times. This time interval may be, for example, 100 ms or 150 ms.

In a further step S3 it is checked whether the collision distance DTC has changed in the predetermined time interval as a function of time. In particular, in the step S3 it is checked whether the collision distance DTC has reduced. If the collision distance DTC has not changed, the method is continued in a step S4. If the collision distance DTC has not changed as a function of time, no collision is predicted between the motor vehicle 1 and the object. In this case, the value of the minimum distance SD is not changed. In the event of the collision distance DTC having reduced as a function of time, the method is continued in the step S5. In this case, the value of the minimum distance SD is changed. In particular, the value of the minimum distance SD is reduced. In particular, the value of the minimum distance SD is reduced by a predetermined correction value a which can be determined as a function of the change in the collision distance DTC.

This may occur, for example, by virtue of the fact that the collision distance DTC is determined at at least two times within the time interval. For example, a measured value of the collision distance DTC1 arises at a time t1. At a second time t2, the value DTC2 arises for the measurement of the collision distance. The change in the collision distance ΔDTC can therefore be calculated according to the following formula:

$$\Delta DTC = DTC2 - DTC1.$$

The adapted value $W_{new}$ of the minimum distance SD can be calculated according to the following formula:

$$W_{new} = W_{current} - a.$$

In this context, $W_{current}$ corresponds to a current or predetermined value of the minimum distance SD. The correction value a can be determined as follows:

$$a = \Delta DTC / \Delta t * k.$$

Here, Δt corresponds to the time difference between the times t1 and t2. The factor k can be stored, for example, as a predetermined value in the memory unit of the control device 3. In this context, the factor k can be predetermined in such a way that the correction value a changes in proportion to or in indirect proportion to the change in the collision distance DTC as a function of time (ΔDTC/Δt).

Figure 3:
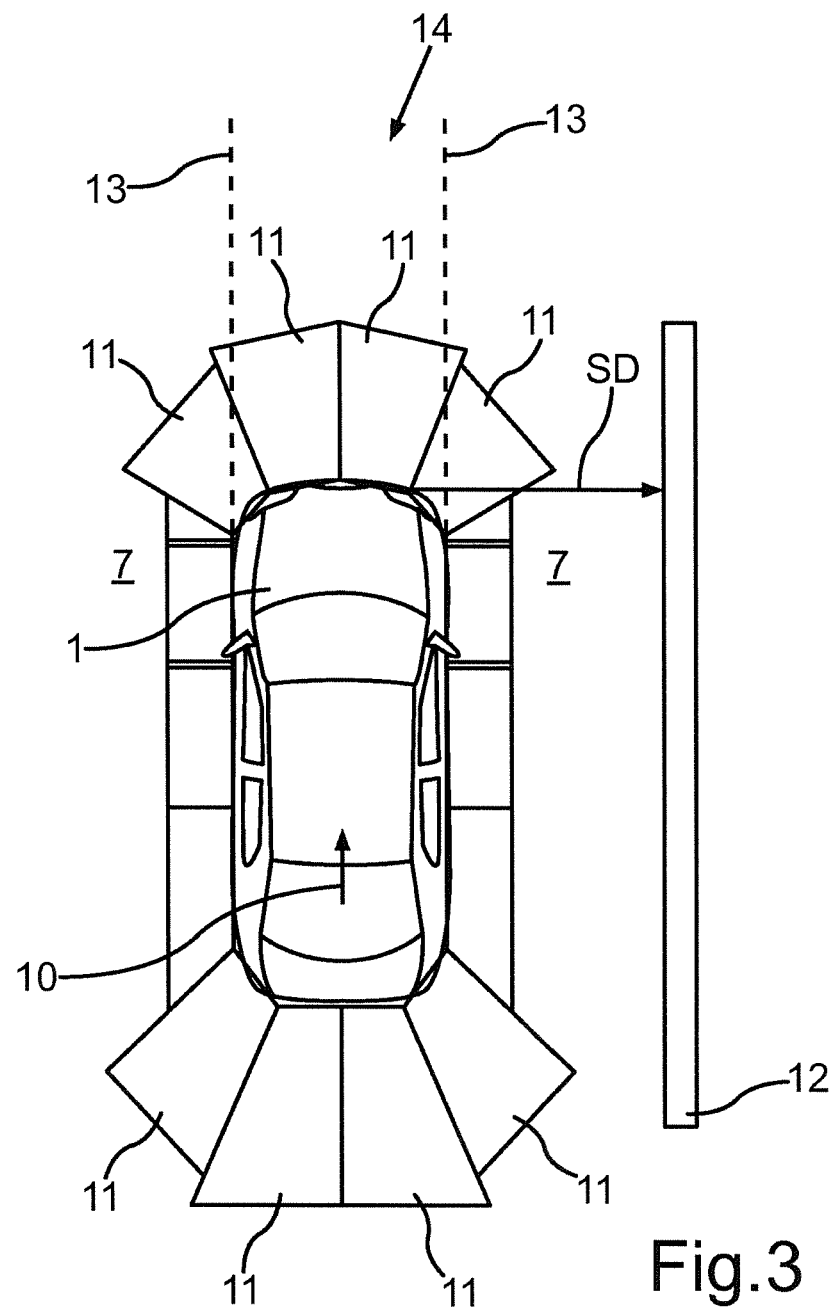
FIGS. 3 to 6 show various scenarios with different arrangements of an object with respect to the motor vehicle, on the basis of which different embodiments of the method are explained.

FIG. 3 shows a first scenario for the clarification of the method according to the invention. Here, the motor vehicle 1 is illustrated in a plan view. The arrow 10 clarifies the direction of travel of the motor vehicle 1. In addition, in this illustration the detection ranges 11 of the distance sensors 4 are illustrated. The detection ranges 11 show schematically those regions which can be monitored with the respective distance sensors 4. A wall is located as an object 12 in the surroundings 7 of the motor vehicle 1. The object 12 or the wall runs parallel to the anticipated driving tube 14 of the motor vehicle 1 in this case. The anticipated driving tube 14 is bounded here by the two lines 13. In this case, the collision distance DTC=0. The collision distance DTC does not change in the course of time, since the motor vehicle 1 is moved parallel to the object 12. In this case, the value of the minimum distance SD is not adapted.

In the example according to FIG. 3, a visual signal can be output by means of the output device 8 in the event of the limiting value being undershot. In the same way there can be provision that the current limiting value is output visually. Alternatively or additionally, an acoustic warning can be output in the event of the limiting value of the value of the minimum distance SD being undershot. In this context there may be provision, in particular, that an acoustic warning is not output in the event of the current value of the minimum distance SD approximating to the limiting value. According to the prior art, for example, a periodic signal is output here whose frequency is increased as the distance reduces. In this way, the driver is not disturbed by the acoustic warning signal in the event of said driver being located near to the object 12 and there being no risk of collision.

Figure 4:
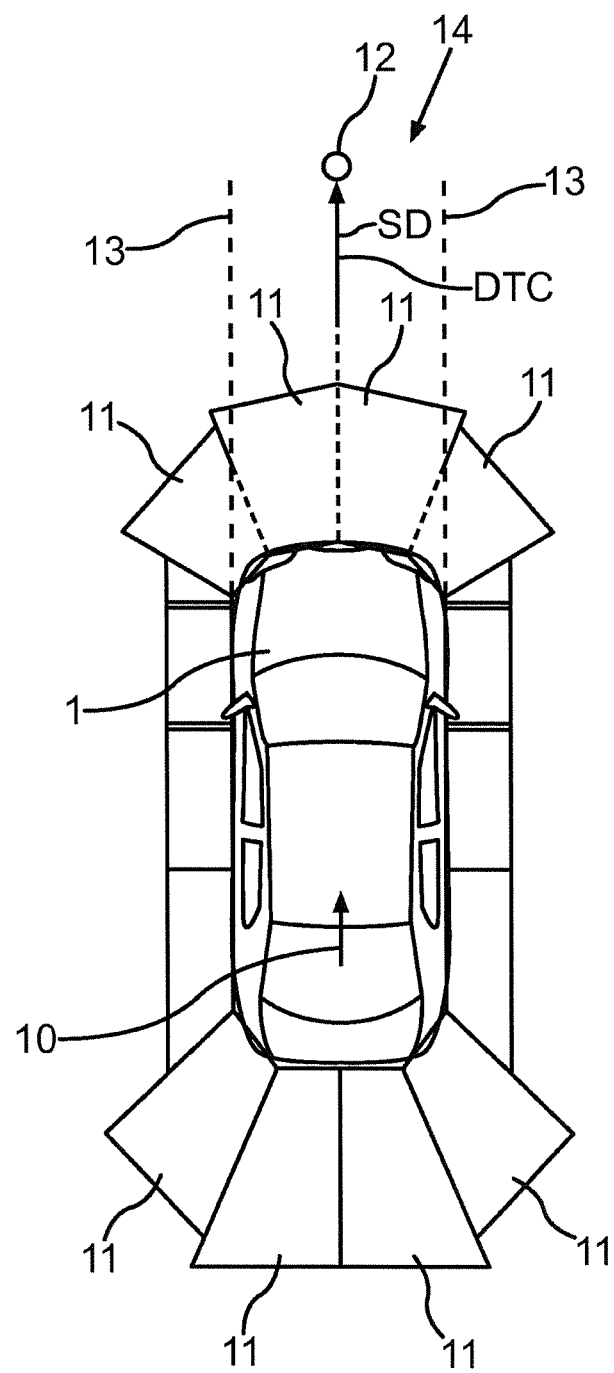

FIG. 4 shows a further scenario in which the object 12 is located directly in front of the motor vehicle 1. In this case, the object 12 is located inside the anticipated driving tube 14 of the motor vehicle 1. In this case, the minimum distance SD corresponds to the collision distance DTC. In this context, the collision distance DTC reduces as a function of time. Therefore, the value of the minimum distance SD can, as described above, be correspondingly adapted and, in particular, reduced. In this case, a visual warning signal can be output in the event of the value of the minimum distance SD undershooting the limiting value. Alternatively or additionally, an acoustic warning signal can be output in the event of the limiting value being undershot.

Figure 5:
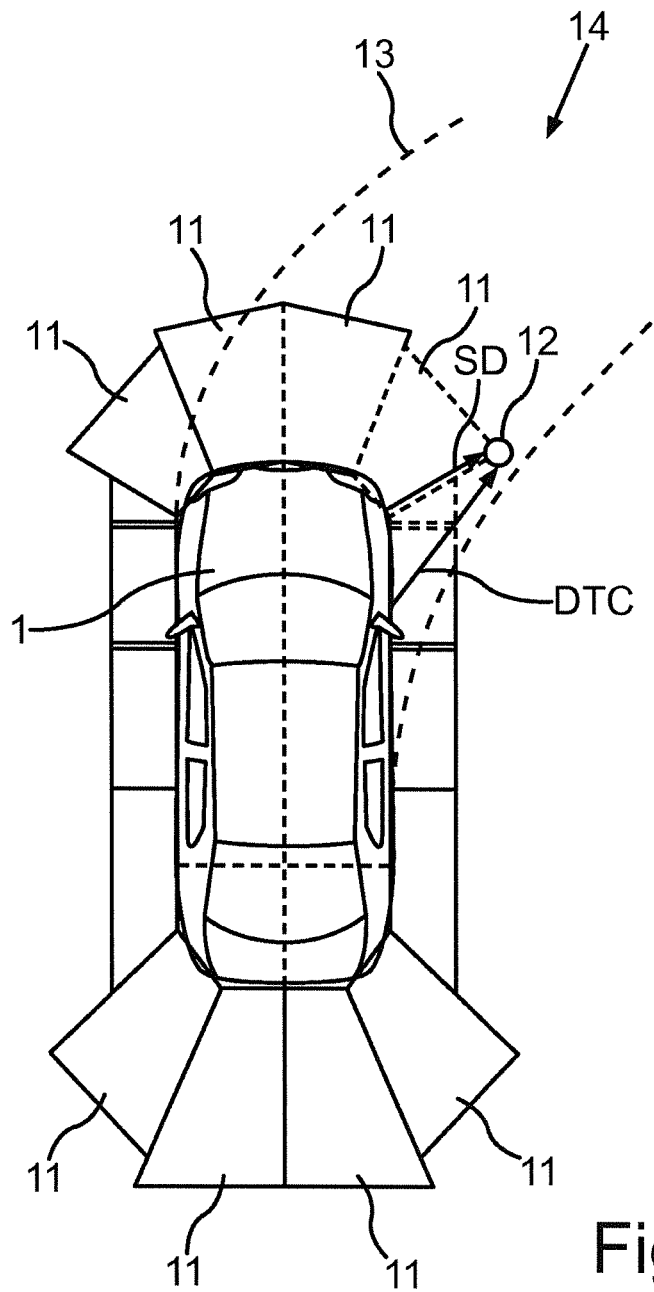

FIG. 5 shows a further exemplary embodiment in which the object 12 is located inside the anticipated driving tube 14 of the motor vehicle 1. The motor vehicle 1 is driving through a bend in the present case. In this case, the minimum distance SD and the collision distance DTC are different. If the motor vehicle 1 is moved inside the predetermined driving tube 14, the motor vehicle 1 will collide, with its front right-hand wheel case, with the object 12. The minimum distance SD, which corresponds in the example shown to the distance between the right-hand headlight and the object 12, is less than the collision distance DTC.

Figure 6:
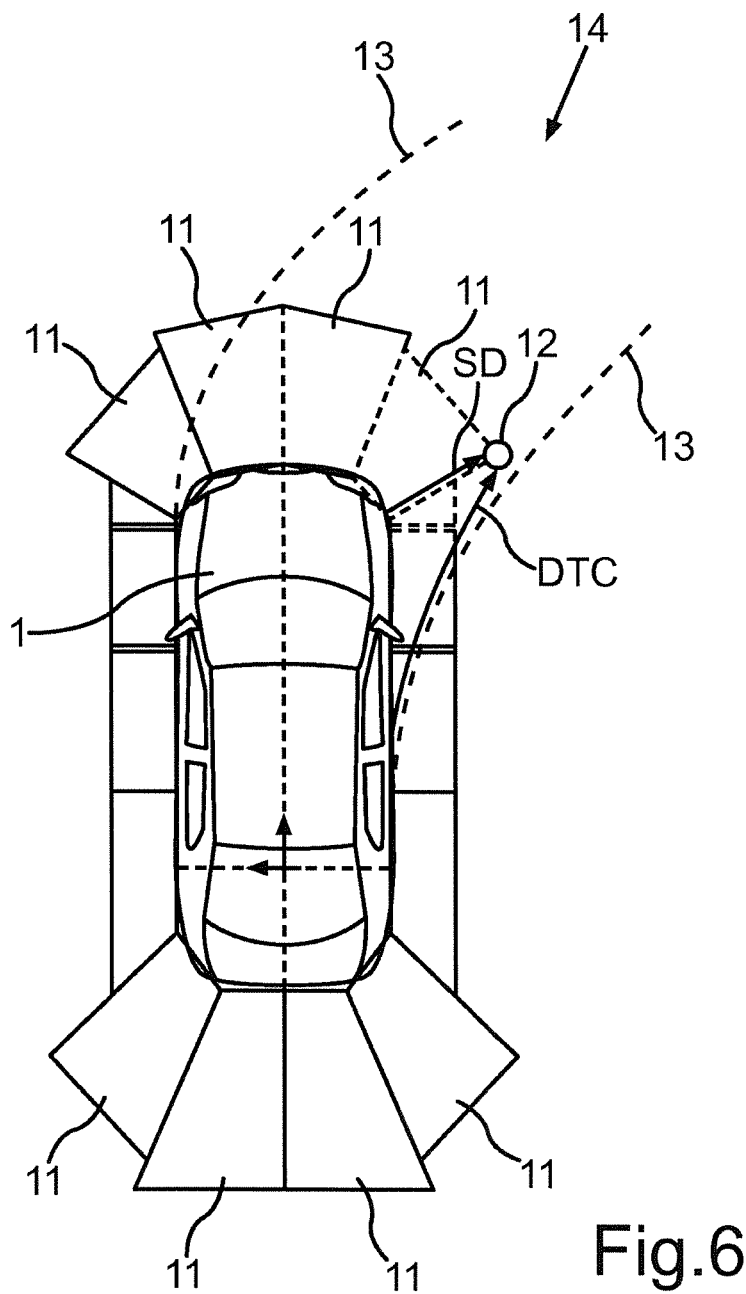

In comparison to this, FIG. 6 shows a scenario in which the object is also located inside the anticipated driving tube 14 of the motor vehicle 1. The motor vehicle 1 is also cornering, wherein the radius of the bend is larger compared to the example according to FIG. 5. This results in a situation in which the motor vehicle 1 would collide with its right-hand side region with the object 12 during the movement within the driving tube 14. The minimum distance SD also corresponds here to the right-hand headlight and to the object 12.

In the example according to FIG. 5, the change in the collision distance DTC as a function of time is greater compared to the example according to FIG. 6, given a respective identical vehicle speed. The value of the minimum distance SD can be reduced in the example according to FIG. 5 by a smaller correction value than in the example according to FIG. 6. The driver can therefore be warned promptly about the object. The warning can be issued visually and/or acoustically when the adapted value of the minimum distance SD is undershot. In this way, a collision between the motor vehicle 1 and the object 12 can be prevented.

The invention claimed is:

1. A method for warning a driver of a motor vehicle about a presence of an object in surroundings of the motor vehicle by a driver assistance system executed by a control device, the method comprising:

determining a position of the object by a sensor device;

determining an anticipated driving tube of the motor vehicle;

determining a collision distance as a function of an amount of time when the motor vehicle collides with the object, wherein the collision distance describes a distance between the motor vehicle and the object when the motor vehicle moves within the determined driving tube, on a basis of the determined position of the object and the determined driving tube;

determining a value of a minimum distance between the motor vehicle and the object and as the function of the amount of time; and outputting a warning signal in response to the value of the minimum distance undershooting a predetermined limiting value, wherein the predetermined limiting value of the minimum distance is adapted as a function of the determined collision distance and changes based on the amount of time when the motor vehicle collides with the object.

2. The method according to claim 1, wherein the determined value of the minimum distance is reduced when the determined collision distance reduces as the function of the amount of time.

3. The method according to claim 2, wherein a correction value is determined on a basis of the reduction in the collision distance as the function of the amount of time, and the predetermined limiting value is reduced by the correction value.

4. The method according to claim 1, wherein the collision distance is determined continuously during a predetermined time period.

5. The method according to claim 4, wherein the predetermined time period during which the collision distance is continuously determined lies in an interval between 100 ms and 150 ms.

6. The method according to claim 1, wherein a visual signal is output as the warning signal if the limiting value is undershot.

7. The method according to claim 1, wherein an acoustic signal is output as the warning signal if the limiting value is undershot and a change in the collision distance is determined as the function of the amount of time.

8. The method according to claim 1, wherein a steering angle and/or a speed of the motor vehicle is determined and the anticipated driving tube is determined on a basis of the determined steering angle and/or the determined speed.

9. A driver assistance system for carrying out a method according to claim 1.

10. The driver assistance system according to claim 9, wherein the driver assistance system comprises a sensor device for determining a position of an object, wherein the sensor device has at least one ultrasonic sensor, at least one camera, at least one radar sensor and/or at least one laser sensor.

11. A motor vehicle having a driver assistance system according to claim 10.

* * * * *